United States Patent Office 3,075,951
Patented Jan. 29, 1963

3,075,951
NONYL PYRIDINE CATALYST FOR
POLYURETHANE REACTION
Robert A. Mosher, Seymour, Ind., assignor to Standard Oil Company, Chicago, Ill., a corporation of Indiana
No Drawing. Filed Mar. 25, 1958, Ser. No. 723,930
2 Claims. (Cl. 260—75)

This invention relates to the polyurethane reaction and particularly to a novel catalyst for use in the preparation of polyurethane reaction products.

It is more usual to use catalyst to speed up a particular reaction, however, there are situations in which a catalyst is necessary to cause a particular reaction to go at a suitable rate for some reason it is not desirable to have an extremely rapid reaction. The known catalysts for the polyurethane reaction are in general efficient and promote rapid reaction times. Even the less effective catalysts still give reasonably rapid times. There are situations where polyurethane reaction product is to be used for potting an object wherein the reaction mixture must flow through relatively narrow passages rather slow catalyst would be helpful. It is an object of this invention to have a polyurethane reaction of a relatively slow setting time. Other objects will become apparent in the course of the detailed description of the invention.

It has been discovered that a polyurethane reaction mixture suitable for uses requiring relatively slow setting contains in addition to the conventional compounds affording at least 2 isocyanate groups and an aliphatic polyhydric alcohol, a catalyst selected from the class consisting of pyridine, quinoline, isoquinoline and substituted members of these, said substituents being selected from the group consisting of alkyl having from 1–15 carbon atoms, hydroxyalkyl having from 1 to 15 carbon atoms, alkaryl and aralkyl.

In addition to pyridine itself vairous substituted pyridines are useful as catalysts in the process. The substituted pyridines may be the picolines, lutidines, or collidines. In addition to the pyridines etc. containing these simple lower alkyl substituents higher molecular weight alkyl substituents such as nonyl, dodecyl or pentadecyl may be present. In general one or more alkyl groups having from 1 to 15 carbon atoms may be present. Alkanol substituents wherein the group is joined to the ring through a carbon atom are suitable; one or more of these alkanol groups each having from 1 to 15 carbon atoms in the group may be present. Substituent(s) may be an alkaryl group or an aralkyl group. The substituent may be positioned on the ring at any point but it is preferred that the substituents be in a position to sterically hinder the nitrogen atom in the ring—especially suitable are substituents on the carbon atoms(s) ortho to the nitrogen atom. In the case of pyridine it is preferred that the substituents be on the 2 and/or 6 positions.

The amount of catalyst used is dependent upon the reactants charged and the desired rate of reaction. In general the amount of catalyst will be between about 0.1 and 10 parts by weight based on 100 parts polyhydric alcohol charged. More usually the amount of catalyst will be between about 1 and 3 parts by weight based on 100 parts of alcohol charged.

The isocyanate affording compound contains at least two of these groups. The compound may be an aromatic diisocyanate such as tolylene diisocyanate, naphthalene diisocyanate, phenylene diisocyanate, diphenylmethane diisocyanate, triphenylmethane triisocyanate; substituted aromatic diisocyanates may be used such as methoxyphenylene diisocyanate, phenoxyphenylene diisocyanate, and chlorophenylene diisocyanate. Aliphatic polyisocyanates may be used such as hexamethylene diisocyanate, tetramethylene diisocyanate, and cyclohexylene diisocyanate. The isocyanate affording compound may be a pre-polymer adduct such as the product of the reaction of tolylene diisocyanate with trimethylolpropane. Also the isocyanate affording compound may be a blocked adduct such as a pre-polymer which has been further reacted with phenol.

The isocyanate affording molecule is reacted with an aliphatic polyhydric alcohol. The simple glycol such as butanediol or hexanediol may be used. The ether glycols such as triethylene glycol and hexamethylene glycol may be used. In the preparation of elastomers it is preferred to use a polyester terminated with hydroxyl groups having a molecular weight between about 600 and 3000. The polyester condensation product of adipic acid and ethylene glycol is particularly suitable. Very tough products are obtained by using a polyester from the condensation reaction of adipic acid, ethylene glycol and some glycerol.

It is to be understood that the catalyst of this invention may be used in any one of the polyurethane reactions and that the particular reactants may be any one of those known to this art. The polyurethane reaction product may be an elastomer or a coating or may be a foamed product made by adding a foam-producing material to the reaction mixture. The catalyst of this process is particularly suitable for use with foaming reaction mixtures since it permits the reaction mixture to penetrate through the void spaces before the reaction has reached the point where viscosity increase to the foaming prevents flow into small voids.

The conditions of the reaction may be those suitable for the particular reactants. Thus, with the ordinary polyisocyanates such as tolyene diisocyanate the reaction is initiated readily at ordinary atmospheric temperatures. In the case of the pre-polymers and blocked adducts the reaction is carried out at elevated temperatures as with ordinary catalyst.

*Tests 1–10*

The effectiveness of various compounds in the class of catalysts are illustrated with a reaction mixture consisting of commercially available reactants. The effectiveness of conventional catalyst in this same system are also illustrated in tests 8–10. The isocyanate affording compound is a commercial mixture of tolylene diisocyanate isomers containing 80 percent of the 2,4-isomer and 20 percent of the 2,6-isomer. The polyhydric alcohol was a condensation product of adipic acid and ethylene glycol having a hydroxyl number of 65 and an acid number of 1.5 with a Brookfield viscosity (77° F.) of 14,000 centipoises. This polyester had a molecular weight of about 1700. The reaction mixture consisted of 100 parts by weight of the polyester, 10 parts by weight of the tolylene diisocyanate and 1 part by weight of a particular catalyst. This system gives a slight excess of isocyanate groups over the hydroxyl groups present in the polyester. It is to be understood that the amount of isocyanate groups may be in large excess over the theoretical requirement as determined by the particular requirements of the polyurethane reaction product. The polyester, the diisocyanate and the catalyst were mixed together in a beaker at about 20° C.—the system has an exotherm which depends upon the particular catalyst in this system. The set time of the particular system was determined as the minutes, after addition of catalyst, to the point when the contents of the beaker became so viscous that no appreciable flow occurred when the beaker was turned on its side. The results of these tests are set out below:

| Test No. | Catalyst | Set Time, Min. |
|---|---|---|
| 1 | 2-(ethanol)pyridine | 60 |
| 2 | 2-(propanol)pyridine | 45 |
| 3 | 2-(5-nonyl)pyridine | 120 |
| 4 | 2-benzylpyridine | 80 |
| 5 | 4-benzylpyridine | 36 |
| 6 | Lutidine (2,6) | 30 |
| 7 | Quinoline | 48 |
| 8 | N-methylmorpholine | 15 |
| 9 | N-ethylmorpholine | 15 |
| 10 | N-cocomorpholine | 45 |

The tests show the benefits of having a large substituent in an ortho position with respect to the nitrogen atom in slowing down the set time of the reaction mixture.

*Tests 11–13*

In these tests the commercial tolylene diisocyanate 80/20 isomeric mixture was used. The hydroxyl affording compound was a partial pre-polymer of a higher molecular weight polyester and tolylene diisocyanate. This polyester contained sufficient carboxyl groups to cause foaming and the production of a foamed polyurethane. The reaction mixture consisted of 100 parts by weight of the pre-polymer, 10 parts by weight of the tolylene diisocyanate and 1 part by weight of the catalyst. The set time of the reaction mixture was determined as in the preceding tests. For comparison a commercial catalyst N-methylmorpholine was used in one test. The results of these tests are set out below.

| Test No. | Catalyst | Set Time, Min. |
|---|---|---|
| 11 | Pyridine | 9 |
| 12 | 2-(ethanol)pyridine | 18 |
| 13 | N-methylmorpholine | 3 |

Thus, having described the invention, what is claimed is:

1. In the process for making a solid polyurethane reaction product, which process is characterized by a relatively slow setting time, wherein a compound affording at least two isocyanate groups selected from the class consisting of aromatic diisocyanates and aliphatic diisocyanates is reacted with a polyhydric alcohol selected from the class consisting of glycols and saturated polyesters terminated with hydroxyl groups, in the presence of a catalyst, under polyurethane reaction conditions, to produce a solid polyurethane product, the improvement which consists essentially of using 2-(5-nonyl)pyridine as said catalyst.

2. A process for preparing a polyurethane reaction product comprising reacting tolylene diisocyanate, about 10 parts by weight, and a polyester condensation product of adipic acid and ethylene glycol having a hydroxyl number of 65, an acid number of 1.5 and a molecular weight of about 1700, about 100 parts by weight, in the presence of about 1 part by weight of 2-(5-nonyl)pyridine.

References Cited in the file of this patent

UNITED STATES PATENTS

| | | |
|---|---|---|
| 2,650,212 | Windemuth | Aug. 25, 1953 |
| 2,867,278 | Mallory et al. | Jan. 6, 1959 |
| 2,894,919 | Simon et al. | July 14, 1959 |
| 2,902,388 | Szukiewicz | Sept. 1, 1959 |
| 2,936,293 | Orth | May 10, 1960 |
| 2,957,832 | Gmitter et al. | Oct. 20, 1960 |

OTHER REFERENCES

Bayer et al.: Rubber Chem. and Tech., 23, pages 812–35 (1950).

Heiss et al.: Ind. Eng. Chem., 46 (No. 7), pages 1498–1503 (1954).